Feb. 23, 1954  A. BERGERON  2,670,255
PISTON PACKING RING
Filed June 21, 1950
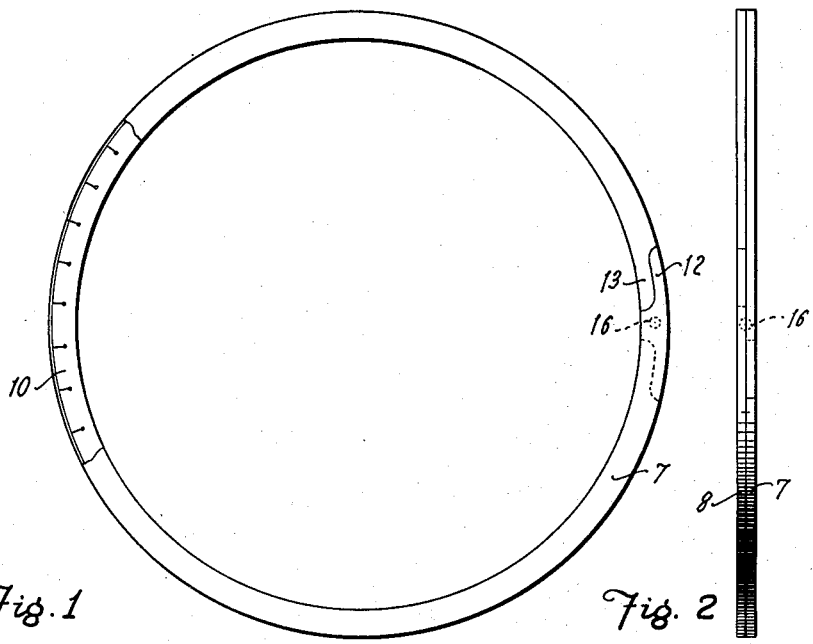
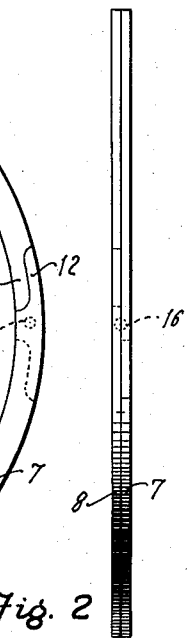
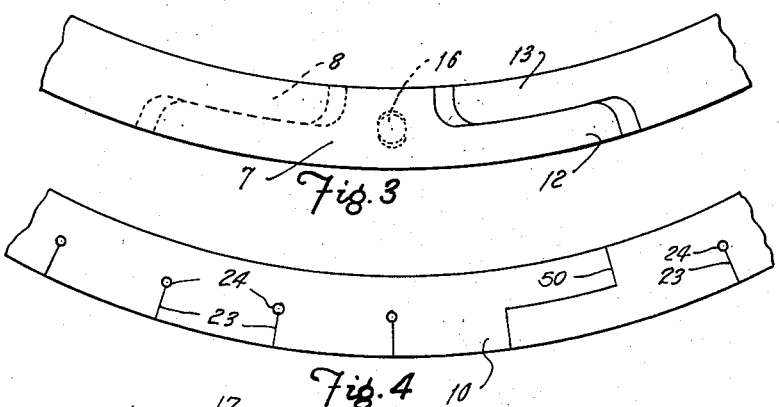
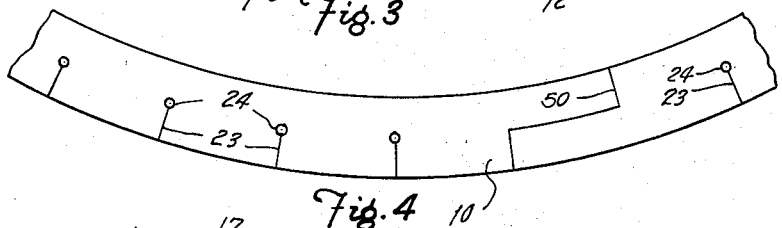
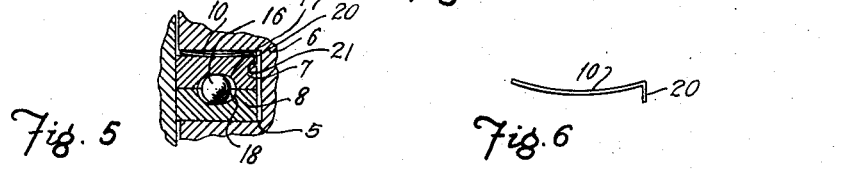
INVENTOR.
Alfred Bergeron
BY
ATTORNEY Patented Feb. 23, 1954

2,670,255

UNITED STATES PATENT OFFICE 2,670,255

PISTON PACKING RING

Alfred Bergeron, Dallas, Tex.

Application June 21, 1950, Serial No. 169,430

14 Claims. (Cl. 309—28)

This invention relates to an improved piston ring or packing ring designed more particularly for use in high pressure engines and pumps. The invention has for an object to provide an improved two-part expansion ring constructed to provide close contact with the cylinder wall together with an auxiliary sealing ring which inhibits leakage of gas or liquid past the piston ring into the piston groove. Another object is to provide means for maintaining the expansion ring in firm engagement against one side of the piston ring groove, thereby preventing hammering of the walls of the groove by the ring during operation and maintaining a better seal.

Another object is to provide an auxiliary, flexible sealing ring for use with an expansion ring to inhibit leakage of gas or liquid past the ring.

Another object is to provide an effective packing ring which can be expeditiously and economically manufactured.

The invention has been developed more particularly for the production of packing rings for high pressure gas and oil engines but it is also applicable to rings for various kinds of liquid and gas pumps including vacuum pumps.

The nature and object of the invention will be better understood from a description of a selected embodiment thereof, for the purposes of which description reference should be had to the accompanying drawing forming a part hereof and in which:

Figure 1 is a plan view of a packing ring embodying the invention, a section of the auxiliary sealing ring being shown but the rest being broken away.

Fig. 2 is an edge view of the same showing the joint between the free ends of the expansion ring.

Fig. 3 is a detail view showing the joint between the ends of the expansion ring.

Fig. 4 is a plan view of a portion of a sealing ring constituting one part of the complete packing ring of the invention.

Fig. 5 is a sectional view showing a packing ring in a piston groove in which it operates.

Fig. 6 is a view showing the shape of the sealing ring when not compressed into its form when in use.

The packing ring shown is designed for use as one of the rings in the usual ring-receiving groove 5 of rectangular cross-section of a piston 6. It comprises an expansion ring made of two circular parts 7 and 8 together with an auxiliary sealing and spring-pressure ring 10 which affords a seal to inhibit high pressure combustion gases or any gas or liquid passing above and behind the expansion ring into the ring-receiving groove. Parts 7, 8 are pivotally connected and have interengaging ends as shown at 12 and 13 cooperating to form a seal radially of the piston. The two parts are connected with their joints in staggered relation thereby to form a seal longitudinally of the piston.

The connection between the two parts of the expansion ring is such that each part may expand separately while the parts co-act to maintain an effective seal. As shown a ball 16 fits into opposed recesses 17, 18 in the two parts and acts as a key to maintain the two parts in suitable relation and prevent one part creeping relative to the other around the piston. Preferably one or both of the recesses are slightly elongated transversely of the ring to form grooves to insure proper bearing of the ring parts against the cylinder wall. It is to be noted that the point of connection is made close to one end of each circular part and the major lengths of the two parts extend in opposite directions from the point of connection. Insofar as each part is slightly weakened such weakening is close to one end of the parts where the bending moment is slight and breakage is unlikely. As shown the two circular parts are identical in structure but reversed in position to form the unit structure. Preferably the tongues at the free ends of both parts of the ring lie inside of the tongues at the connected ends.

The sealing ring 10 is formed with a cylindrical flange 20 at its inner edge which fits in a cylindrical recess 21 extending along the inner periphery of the upper part 7 at its upper edge as shown in Fig. 5. The sealing ring is of generally flat shape except for the flange 20 but is slightly curved or arched transversely of its length to provide a spring action whereby at substantially the center of its width radially or at the crown of the arch it will bear against the top of the expansion ring part 7 as indicated in Fig. 5 and along its edges it will bear against the upper face of the ring-receiving groove of the piston also as indicated in Fig. 5. In order that the sealing ring may be opened to apply it to a piston it is cut on a broken line as shown at 50 and the ends engaged to provide a substantially continuous ring as indicated in Fig. 4. The material of the ring and its dimensions are chosen to provide the desired spring action under the conditions of use. Various suitable alloys are available. When the packing ring is used on a high compression engine or pump the ring is so assembled that the high pressure acts with and not in opposition to the spring pressure of the sealing ring to maintain sealing contact. When used on a vacuum pump or the like the position of the ring may be reversed if desired.

The outer diameter of the sealing ring is made sufficiently less than the diameter of the piston with which the packing ring is to be used so that the outer edge will at all times in use lie inside of the outer face of the piston. The object of this provision is to reduce the possibility of gas pressure during an explosion of the engine exerting pressure on the upper surface of this sealing ring and to permit such gas pressure to engage the upper face of the packing ring. By this arrangement the gas pressure cooperating with the spring pressure of the sealing ring presses the two parts of the ring together and the expansion ring as a whole firmly against the lower face of the ring-receiving groove to insure a good seal.

If desired the flexibility of the sealing ring may be increased by forming the radial slots 23 at spaced intervals along the outer part of the ring, preferably with their inner ends terminating in small drilled or punched holes 24 to prevent breakage. Slots 23 should be of minimum width and, in fact, can be and should be so formed that they are practically closed to prevent passage of any substantial amount of gas. The holes should lie along the center line of the ring, that is to say at the crown of the arch where it bears on the expansion ring as indicated in Fig. 3 in order that the holes may be substantially sealed by this contact.

It is to be understood that the foregoing particular description of the selected embodiment of the invention is illustrative merely and that variations of structure and arrangement and other uses of the novel features in different combinations may be made without departing from the spirit of the invention as defined in the claims.

I claim:

1. A two-part packing ring for a piston of the character described comprising two similar circular parts, each reduced at its ends to form tongues rectangular in cross-section overlapping radially to provide a seal at the joint to prevent radial blow-by, the overlapping of the two parts being spaced circumferentially to provide sealing against blow-by longitudinally of the piston whereby the body of the ring of one part seals against blow-by longitudinally of the piston at the joint of the other part, said parts having connecting means located at a point adjacent one reduced end of each part, with the lengths of the two parts extending in opposite directions from the said connecting means, said last-named means consisting of a ball engaging recess means in the opposed faces of the two parts, and a ball in said recess means.

2. A packing ring of the character described comprising a two-part ring, each part having a pair of engageable overlapping complementary ends forming a seal, together with a flexible sealing ring of thin spring metal having a cylindrical flange on its inner edge engaging within one part of the two-part ring to limit the radial outward movement of said sealing ring, said sealing ring being arched transversely to provide spring action pressing the two-part ring together and against the wall of the piston groove.

3. A packing ring of the character described comprising two similar circular parts, each having overlapping ends forming a seal, means pivotally connecting the two parts near one end of each and a flexible sealing ring of thin metal engaging one face of one circular part, said sealing ring being curved transversely of its length and being compressible transversely of its thickness to press the parts resiliently together.

4. A two-part packing ring for use in the ring-receiving groove of a piston comprising an expansion ring and a flexible sealing ring engaging one face of the expansion ring, said sealing ring being arched transversely of its length and resiliently compressible to engage resiliently between the expansion ring and the wall of the ring-receiving groove with the crown of the arch engaging the expansion ring to provide spring action pressing the two-part ring against the wall of the piston groove, said sealing ring being slotted transversely to increase its flexibility, the slots extending from the outer edge of the ring to the high point of the arch and terminating in holes at the high point of the arch, which holes are substantially sealed by the engagement of the high point of the arch and the part engaged thereby.

5. A two-part packing ring for use in a rectangular ring-receiving groove of a piston comprising an expansion ring and a flexible sealing ring, said sealing ring being arched transversely of its length and resiliently compressible to engage resiliently between the expansion ring and the wall of the ring-receiving groove with the crown of the arch engaging the expansion ring to provide spring action pressing the two-part ring against the wall of the piston groove, said sealing ring having a cylindrical flange engaging the inner face of the expansion ring to limit outward radial movement of the sealing ring, said sealing ring being of smaller diameter than the piston to prevent projection of the sealing ring beyond the outer face of the piston.

6. A two-part packing ring for use in a rectangular ring-receiving groove of a piston comprising an expansion ring and a flexible sealing ring, said sealing ring being arched transversely of its length and resiliently compressible to engage resiliently between the expansion ring and the wall of the ring-receiving groove with the crown of the arch engaging the expansion ring and the edges of the arch engaging the wall of the piston groove to provide spring action pressing the two-part ring against the wall of the piston groove, said expansion ring having a recess along the upper edge of its inner periphery and said sealing ring having a cylindrical flange at its inner edge engaging in said recess to prevent radial outward movement of the sealing ring, substantially as and for the purpose described.

7. A packing ring of the character described comprising a two-part ring, each part having a pair of engageable overlapping complementary ends forming a seal, together with a flexible sealing ring of thin spring metal having a cylindrical flange on its inner edge engaging within one part of the two-part ring to limit the radial outward movement of said sealing ring, said sealing ring being arched transversely to provide spring action pressing the two-part ring together and against the wall of the piston groove, one of said rings having a groove and another of said rings having a ball recess, and a ball in said recess and groove.

8. A packing ring of the character described comprising two similar circular parts, each having overlapping ends forming a seal, means pivotally connecting the two parts near one end of each and a flexible sealing ring of thin metal engaging one face of one circular part, said sealing ring being curved transversely of its length and being compressible transversely of its thickness to press the parts resiliently together, one of said rings having a groove and another of said rings having a ball recess, and a ball in said recess and groove.

9. A two-part packing ring for a piston of the character described comprising two similar circular parts, each reduced at its ends to form tongues rectangular in cross-section overlapping radially to provide a seal at the joint to prevent radial blow-by, the overlapping of the two parts being spaced circumferentially to provide sealing against blow-by longitudinally of the piston whereby the body of the ring of one part seals against blow-by longitudinally of the piston at the joint of the other part, said parts having connecting means located at a point adjacent one reduced end of each part, with the lengths of the two parts extending in opposite directions from said connecting means, said last-named means consisting of a ball-engaging recess means in the opposed faces of the two parts, a ball in said recess means, said recess means comprising a substantially ball-shaped recess in one of said parts and an elongated radially extending recess in the other part.

10. A packing ring for use in the ring-receiving groove of a piston comprising an expansion ring comprising an upper expansion ring part and a lower expansion ring part and a flexible sealing ring engaging one face of the expansion ring, said sealing ring being arched transversely of its length and resiliently compressible to engage resiliently between the expansion ring and the wall of the ring-receiving groove with the crown of the arch engaging the expansion ring, said sealing ring being slotted transversely to increase its flexibility, the slots extending from the outer edge of the ring to the high point of the arch and terminating in holes at the high point of the arch, which holes are substantially sealed by the engagement of the high point of the arch and the part engaged thereby, said upper expansion ring part having a groove in the undersurface thereof and said lower expansion ring part having a ball recess in the upper face thereof, and a ball in said recess and groove.

11. A packing ring for use in a rectangular ring-receiving groove of a piston comprising an expansion ring comprising an upper expansion ring part and a lower expansion ring part and a flexible sealing ring, said sealing ring being arched transversely of its length and resiliently compressible to engage resiliently between the expansion ring and the wall of the ring-receiving groove with the crown of the arch engaging the expansion ring, said sealing ring having a cylindrical flange engaging the inner face of the expansion ring to limit outward radial movement of the sealing ring, said sealing ring being of smaller diameter than the piston to prevent projection of the sealing ring beyond the outer face of the piston, said upper expansion ring part having a groove in the undersurface thereof and said lower expansion ring part having a ball recess in the upper face thereof, and a ball in said recess and groove.

12. A packing ring for use in a rectangular ring-receiving groove of a piston comprising an expansion ring comprising an upper expansion ring part and a lower expansion ring part and a flexible sealing ring, said sealing ring being arched transversely of its length and resiliently compressible to engage resiliently between the expansion ring and the wall of the ring-receiving groove with the crown of the arch engaging the expansion ring and the edges of the arch engaging the wall of the piston groove, said expansion ring having a recess along the upper edge of its inner periphery and said sealing ring having a cylindrical flange at its inner edge engaging in said recess to prevent radial outward movement of the sealing ring, substantially as and for the purpose described, said upper expansion ring part having a groove in the undersurface thereof and said lower expansion ring part having a ball recess in the upper face thereof, and a ball in said recess and groove.

13. A two-part packing ring for a piston, a pair of similar circular parts, each ring part being reduced at its ends to form inter-engaging ends for that ring to form a seal at the respective ends of each ring part, and connecting means between said rings for preventing substantial relative rotation between said circular ring parts consisting of ball-engaging recess means in the opposed faces of the two ring parts, and a ball in said recess means.

14. A ring structure in accordance with claim 13 in which the ball-engaging recess means comprises an elongated groove in the face of one ring part and a substantially cup-shaped recess in the confronting face of the other ring part.

ALFRED BERGERON.

References Cited in the file of this patent

UNITED STATES PATENTS

| Number | Name | Date |
|---|---|---|
| 1,251,630 | Brandum | Jan. 1, 1918 |
| 1,344,342 | Hanson | June 22, 1920 |
| 1,413,409 | Lackman | Apr. 18, 1922 |
| 1,781,183 | Lewis et al. | Nov. 11, 1930 |
| 1,822,101 | Lewis | Sept. 8, 1931 |
| 1,828,209 | Thomas | Oct. 20, 1931 |
| 2,060,335 | Muchnic | Nov. 10, 1936 |
| 2,387,855 | Phillips | Oct. 30, 1945 |
| 2,425,649 | Smith | Aug. 12, 1947 |

FOREIGN PATENTS

| Number | Country | Date |
|---|---|---|
| 567,496 | France | Dec. 7, 1923 |